United States Patent

[11] 3,596,965

| [72] | Inventor | Cecil B. Woofter<br>Newton, Iowa |
|---|---|---|
| [21] | Appl. No. | 782,500 |
| [22] | Filed | Oct. 22, 1968 |
| [45] | Patented | Aug. 3, 1971 |
| [73] | Assignee | The Vernon Company |

[54] MULTIPURPOSE HAND UTENSIL
1 Claim, 10 Drawing Figs.

[52] U.S. Cl. ........................................... 294/28,
30/150
[51] Int. Cl. ........................................... A47j 45/00
[50] Field of Search ........................................... 294/28, 29,
30, 31; 30/150

[56] References Cited
UNITED STATES PATENTS
943,220  12/1909  Dufor ........................... 294/31 UX
FOREIGN PATENTS
1,116,359  11/1961  Germany ..................... 294/28

Primary Examiner—Harvey C. Hornsby
Assistant Examiner—Douglas D. Watts
Attorney—Erwin F. Adams ABSTRACT: A multipurpose household hand utensil comprising individual, separate complementary members having elongated handles detachably hingedly connected to perform as gripping tongs and separately useable.

PATENTED AUG 3 1971     3,596,965
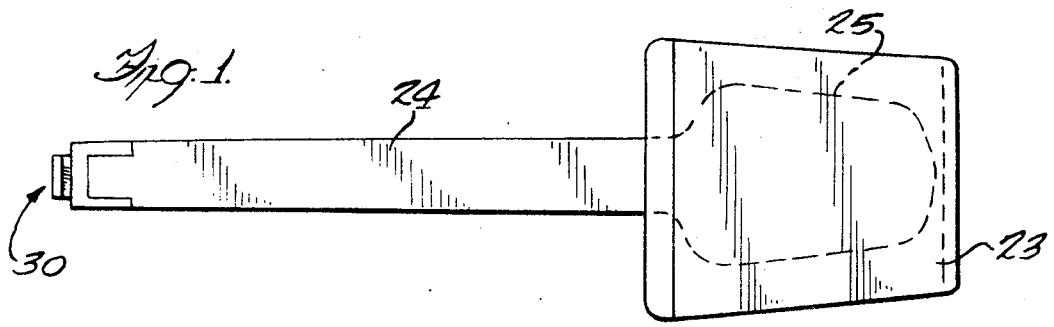
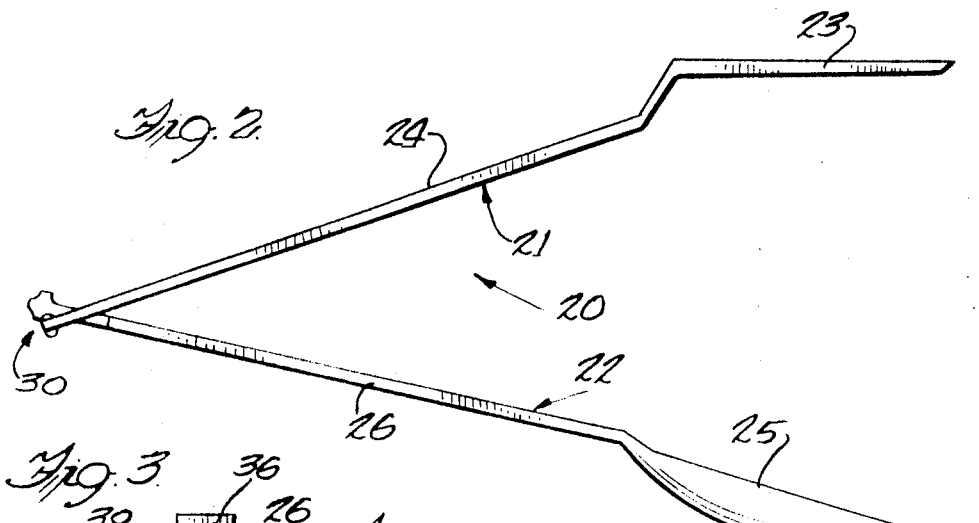
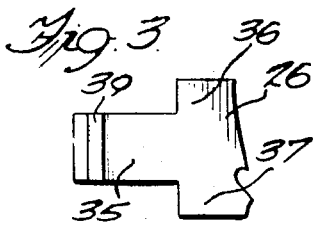 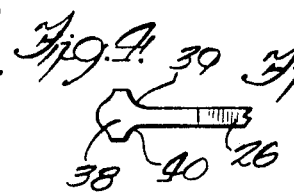 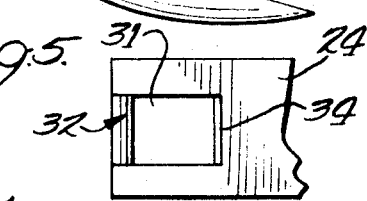
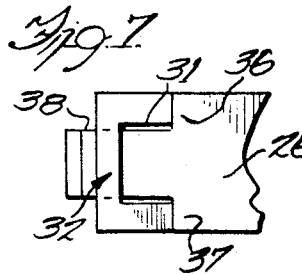 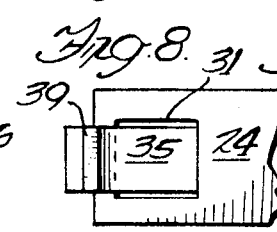 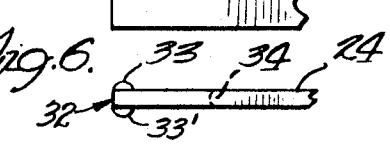
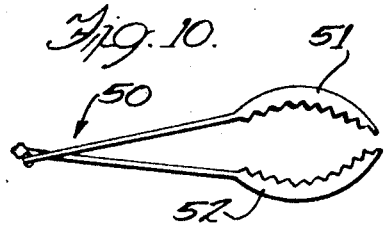
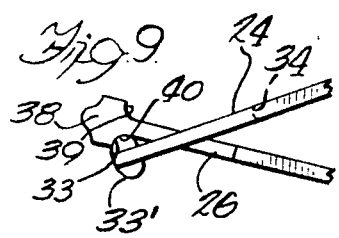
Inventor
Cecil B. Woopter
by: Erwin F. Adan
Atty

MULTIPURPOSE HAND UTENSIL

There are many prior art household hand utensils particularly adapted for use in the kitchen. For example, one such utensil is a spatula used for picking up or turning over fried foods in a skillet such as eggs, hamburgers or the like. Another such utensil is the kitchen spoon which is relatively larger in size than the ordinary tablespoon and is used for mixing or stirring liquid foods. Another common kitchen utensil is the pair of tongs which have complementary gripping or grasping portions at one end and are hingedly permanently connected at the other end for use in removing objects, such as removing vegetables from a pan of hot water. Other types of special purpose utensils are also in common use in the ordinary household. The net effect of the multiplicity of such special purpose hand utensils is that one kitchen drawer becomes cluttered with numerous utensils having a special purpose and occasional use.

The present invention provides a multipurpose hand utensil for use in the house and of particular use in the kitchen although its applicability will be obviously not restricted thereto. This multipurpose household utensil may be used for gripping, grasping or holding objects when used together so as to perform as a pair of tongs, and may also be used separately for mixing, scraping, tossing salad, or other uses depending upon the particular configuration of the individual separate elements. Consequently, it is an object of the present invention to provide a multipurpose hand utensil comprising a pair of individual separate members each having elongated handles which are detachably hinged at the free ends thereof but are not easily disengaged when in combined use.

It is another object of the present invention to provide a household utensil of the above-described type which can replace several separate utensils such as a spatula, spoon, or tongs so as to reduce kitchen drawer clutter.

Yet another object of the present invention is to provide a household utensil of the above-described type wherein the two elements may be easily detached for cleaning and compact storage.

Still one more object of the present invention is to provide a household utensil comprising a pair of individual separate members each having elongated handle portions detachably hinged together and fabricated from tough-durable, relatively heat-resistant plastic so as to be usable for the removal of objects in a hot medium such as eggs, vegetables or baby bottles out of a pan of hot water or hamburgers from a grill.

Still one further object of the present invention is to provide a household utensil of the above-described type which is of low cost, of simple and sturdy construction, and is easy to use.

And yet one more object of the present invention is to provide a household utensil comprising a pair of separable individual members each having elongated handles detachably connected together which can be used as a premium item whereby the premium donor may forward one of such separable members to a prospective customer with notice that the complementary member may be obtained by a visit to the business establishment.

Other objects and advantages of this invention will be readily apparent from the following description when considered in connection with the appended drawings

IN THE DRAWING:

FIG. 1 is a top plan view of an exemplary embodiment of a multipurpose hand utensil constructed in accordance with the present invention;

FIG. 2 is a side elevation view of the utensil shown in FIG. 1;

FIG. 3 is a detail fragmentary view of the end portion of one of the handles of the utensil;

FIG. 4 is a side elevation view of FIG. 3;

FIG. 5 is a detail fragmentary view of a portion of the other handle of the utensil;

FIG. 6 is a side elevation view of FIG. 5;

FIG. 7 is a top plan view of the end portions of the engaged utensil handles;

FIG. 8 is a bottom plan view of the end portions of the engaged utensil handles;

FIG. 9 is a side elevation view of FIG. 8; and

FIG. 10 is a modified exemplary embodiment of a multipurpose hand utensil constructed in accordance with the present invention.

Referring now to the drawing, there is shown an exemplary embodiment of a multipurpose hand utensil constructed in accordance with the present invention and indicated generally with the reference numeral 20. Hand utensil 20 comprises a pair of individual separate members indicated generally at 21 and 22. In the exemplary embodiment 20, the member 21 comprises a holding, gripping, or clamping portion indicated at 23 and an elongated longitudinally extending handle 24. The second member 22 of exemplary hand utensil 20 also includes a holding, grasping or clamping portion indicated at 25 and an elongated handle 26.

As seen best in FIGS. 1 and 2, the grasping portion 23 of member 21 of the exemplary hand utensil comprises a spatula including a broad flat portion and a beveled forward edge. The other member 22 of exemplary hand utensil 20 has a grasping portion 25 defining a spoon, the cup portion of which, is generally larger than the ordinary dinnerware tablespoon.

The longitudinally extending handles 24, 26 include detachable hinge means, which in the exemplary embodiment, include the interlocking handle end portions indicated generally at 30. More specifically, the handle 24 includes an interlocking end portion, as seen in FIG. 5 comprising a substantially rectangular opening 31 through the handle and adjacent one end thereof. Rearwardly of opening 31 and defined thereby is a pivot bar, indicated generally by reference character 32 defining an upper bearing surface 33, and a lower bearing surface 33 as seen best in FIG. 6. The forward transverse edge of the opening 31 in handle 24 is defined by a pair of rearwardly sloping surfaces indicated at 34.

Referring to FIGS. 3 and 4, there is shown the other interlocking handle end including a substantially rectangular tongue 35 of substantially the same width as opening 31 and receivable therein. Tongue 35 defines shoulders 36, 37 on handle 26 for purposes to be described more fully hereinafter. Tongue 35 also includes an enlarged end portion 38 defining a pair of bearing surfaces 39, 40.

Each of the members comprising hand utensil 20 are fabricated of resilient plastic material such as polyethylene or nylon so as to be tough, durable and relatively heat resistant When engaged, as seen in detail in FIGS. 7 through 9, tongue 35 is received in rectangular opening 31 so that the enlarged end portion 38 of handle 26 engages the pivot bar 32 of handle 24. More particularly, as seen in FIG. 9, the bearing surface 40 of enlarged end portion 38 is in rotating contact with the bearing surface 33 of handle 24. So disposed, the two members are pivotally secured to one another at one end so as to be usable as tongs.

It will be readily appreciated that the two members may be easily disengaged from one another without requiring the movement of any clips, latches or like securing devices and without twisting one member relative to another. The exemplary embodiment of the multipurpose hand utensil shown and described will now be seen to satisfy all of the aforementioned objects. There is further shown in FIG. 10, a second embodiment 50 of a multipurpose hand utensil the hinge means of which is in all respects identical to hinge means 30 of embodiment 20 but which includes gripping portions 51 and 52 being identical in shape and particularly adapted for grasping objects such as eggs, potatoes or the like.

Having now described several exemplary embodiments of multipurpose hand utensils constructed in accordance with the present invention it will be obvious to those having ordinary skill in the art that certain modifications and changes may be made without departing from the spirit of the invention which is to be limited only by the appended claims.

I claim:

1. A multipurpose hand utensil executed entirely in resilient plastic, said utensil consisting of:

1. a first member (21) having a first longitudinally extending handle (24),
2. a second member (22) having a second longitudinally extending handle (26),
3. detachable hinge means defined between the free ends of said handles and forming the sole means for joining said members together,
   a. said hinge means including a pivot bar (3) at the free end of said first handle,
   b. a pair of spaced sidewalls (FIG. 5) located adjacent to the free end of said first handle and disposed at right angles to said pivot bar,
   c. sloping surfaces (34) located adjacent to the inner end of said sidewalls and disposed parallel to said pivot bar,
   d. said pivot bar, said sidewalls and said sloping surfaces defining a rectangular opening (31) adjacent to the free end of said first handle,
   e. said pivot bar being thicker than the remainder of said first handle,
   f. a rectangular tongue formed at the free end of said second handle,
   g. the outermost end of said tongue terminating in an enlarged, thickened end section (38),
   h. said tongue being smaller in width than said rectangular opening to freely pass therethrough,
   i. said pivot bar of said first handle abutting against said enlarged end section of said second handle (FIG. 7) for preventing inadvertent separation of said handles,
   j. shoulders formed on said second handle adjacent to the innermost end of said tongue and spaced apart a distance equal to the width of said tongue,
   k. said shoulders engaging the sidewalls of said rectangular opening in the first handle to limit the pivotal movement of said members toward each other (FIGS. 9, 10),
   L. complementary bearing surfaces (33,40) defined between said handles at the intersection of said tongue and said thickened pivot bar,
   m. said bearing surfaces engaging each other for facilitating hinge movement of one of said members relative to the other of said members.